Patented June 25, 1935

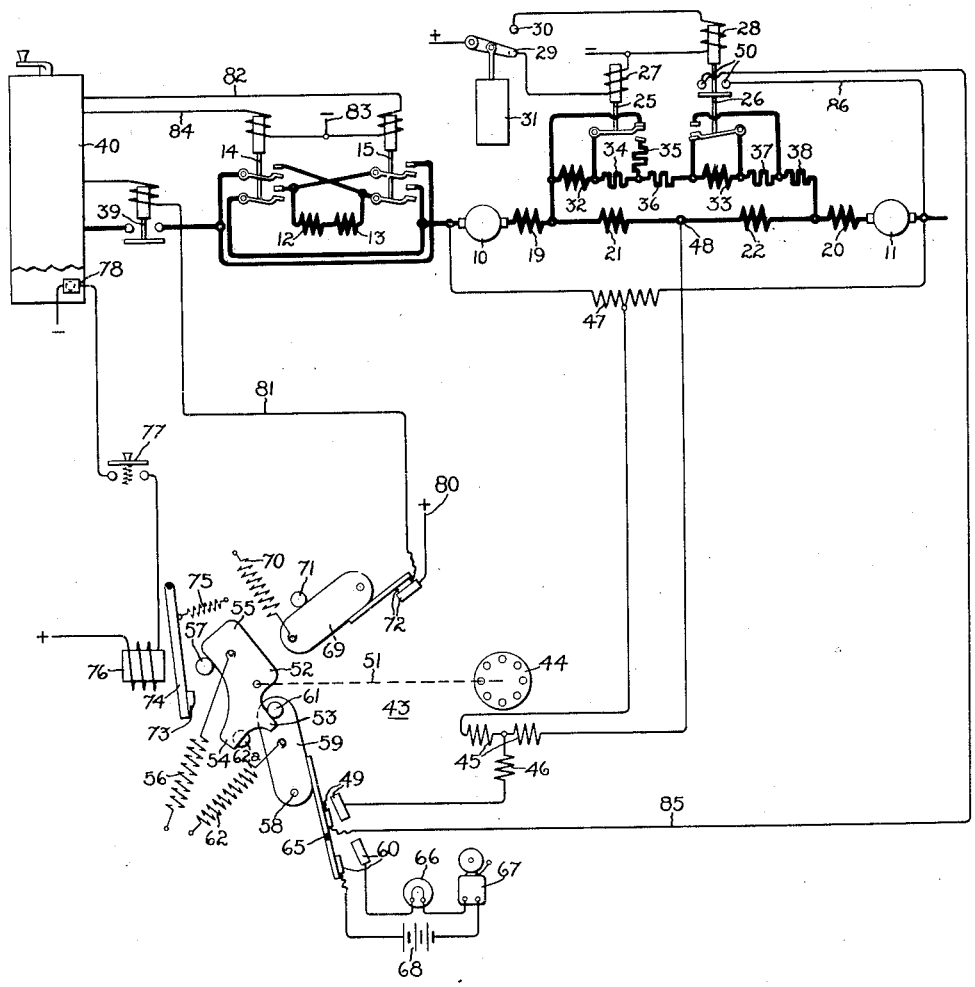

2,006,173

UNITED STATES PATENT OFFICE 2,006,173

CONTROL SYSTEM

Jacob W. McNairy and Harold S. Ogden, Erie, Pa., assignors to General Electric Company, a corporation of New York Application November 9, 1934, Serial No. 752,318

13 Claims. (Cl. 172—179)

Our invention relates to systems for controlling electric motors, more particularly to systems for protecting series connected electric motors against abnormal conditions such as may occur upon a sudden change in the relative magnitudes of the motor loads, and has for an object the provision of a simple and reliable system of this type for protecting the motors under all conditions of operation.

In the application of series connected motors, particularly single-phase motors of the commutator type, to individual loads, serious operating difficulties and often complete failure of one of the motors may occur due to a sudden decrease of load on one of the motors. Particularly is this true when electric vehicles having two or more driving motors which are severally geared or otherwise connected to the driving axles of the vehicle are accelerated too rapidly under severe load conditions.

Under such conditions slipping may occur between the driving wheels and the track whereby the speed of one set of motors is materially increased relative to the speed of the other motors. The occurrence of excessive slipping will subject certain of the motors to dangerously high mechanical stresses due to overspeeding and may also result in flashovers. The danger of injury to the motors is aggravated by the fact that the field controlling relays and contactors may not have sufficient time to change over and prevent flashover.

Various systems have heretofore been proposed for protecting the driving motors of an electric vehicle against abnormal conditions due to wheel slippage, in which systems the differential in the relative speeds of the driving motors is used as a criterion of the wheel slippage to interrupt the motor circuits upon the occurrence of a predetermined differential speed. In starting long heavy trains it is undesirable to interrupt the motor circuits during starting, as a complete loss of tractive effort will cause a surge in the train which may break the couplers. In order that the operator may accelerate heavy trains without complete loss of tractive effort, it is desirable that a signal be given to the operator upon the occurrence of a nominal slip so that the controller can be notched back to stop the slipping without completely shutting off. If, however, the operator fails to respond to the signal and the motors approach a dangerous speed, the motor circuits must be interrupted, regardless of the loss of tractive effort, in order to prevent injury to the motors. When the train is operating at relatively high speeds, interruption of power is not so objectionable from the standpoint of tractive effort, but the permissible differential speed which may be permitted is considerably less, due to the high operating speed of the motors. For example, when the motors are operating at low speeds, as when the electric vehicle is starting to accelerate a differential speed of twenty miles per hour may be permissible, while at high operating speeds a differential speed of only five miles per hour may seriously endanger the motors. In systems which take no account of the operating speed of the train, serious operating difficulties occur, either through unnecessary loss of tractive effort during starting, or through failure to interrupt the motor circuits soon enough at high operating speeds. Accordingly, it is a further object of our invention to provide a protective system for series connected traction motors which is responsive to a differential speed of the motors, the value of differential speed to which the system is responsive being dependent upon the operating speed of the motors.

In carrying out our invention in one form thereof, we provide in connection with a plurality of series connected motors, a control system which includes means for energizing a visible and audible signal upon the occurrence of a predetermined differential in motor speeds and means for deenergizing the motor circuit upon the occurrence of a higher predetermined differential in the motor speeds together with means for deenergizing the motor circuit at the lower value of differential speed when the motors are being operated at a high speed. More specifically, we provide a protective system which includes a relay having two operating windings, one of which is connected for energization in accordance with a voltage proportional to the differential speed of the series connected motors and the other of which is normally deenergized when the motors are operated at low speeds. The relay is provided with a first set of contacts operable upon a rotation of the relay corresponding to a predetermined low differential speed for energizing a signal circuit and for partially completing an energizing circuit for the second operating winding of the relay, and a second pair of contacts operable upon a further rotation of the relay corresponding to a predetermined higher differential speed to deenergize the motor circuit. Means are also provided which are responsive to the operating speed of the motors for completing the circuit to the second operating winding of the relay to cause an immediate further operation of the relay and an actuation of the second set of relay contacts upon the coincident occurrence of the predetermined low differential speed and a predetermined high motor speed.

For a more complete understanding, reference should now be had to the drawing, the single figure of which is a diagrammatic illustration of a control system for electric motors embodying our invention.

Referring now to the drawing, we have shown our invention in one form as applied to single-phase, alternating-current commutator motors 10 and 11 connected in series with each other and having series exciting field windings 12 and 13 connected on the controller side of the armature of the motor 10 in circuit with a pair of field controlling switches 14 and 15. The motors 10 and 11 are provided with series compensating field windings 19 and 20 and with interpole field windings 21 and 22 respectively.

In order to insure the correct phase relations and magnitudes of the currents in the interpole field windings, a pair of switches 25 and 26, respectively, provided with operating windings 27 and 28 connected in circuit with the fixed contacts 29 and 30 of a relay 31 which is responsive to the speed of the motors, are arranged to control the reactances 32 and 33 and the resistances 34 to 38 inclusive connected in parallel circuit relation with the interpole field windings. The relay 31, which we have shown somewhat diagrammatically, is directly responsive to the speed of one of the motors 10 and 11. Since under normal running conditions, the motors operate at substantially the same speed, the relay 31 is obviously responsive to the speed of the two motors under such conditions. It is preferably of the type disclosed and claimed in Patent No. 1,972,688, to McNairy and Pritchard, issued September 4, 1934, and controls the switches 25 and 26 in the manner therein described. The circuit connections for energizing the relay 31 in accordance with the electrical condition of the motors 10 or 11, which are herein omitted in order to simplify the drawing, will be obvious upon reference to the McNairy and Pritchard patent. In order to accelerate the motors 10 and 11, a controller 40, shown as a conventional drum type controller, is arranged to connect the motors in energizing circuit relation with a suitable source of alternating current (not shown) through a line switch 39.

The motors 10 and 11 are connected to drive individual loads, as for instance, separate axles of an electric vehicle and in order to protect the motors from abnormal conditions such as may occur upon a sudden change in the relative values of the motor loads, due, for example, to the slipping of some of the vehicle wheels, we provide a relay 43 the operating element of which consists of a single-phase shaded pole induction motor having a rotor 44, a main operating winding 45 and a second operating winding 46. The operating winding 45 is connected for energization in accordance with a voltage proportional to the differential in the speed of the two motors 10 and 11, one end of the winding 45 being connected to the midpoint of an autotransformer 47 connected in parallel circuit relation across a series circuit comprising the motor armatures, the compensating field windings and the interpole field windings, and the other end of the operating winding 45 being connected to the electrical midpoint 48 of the motor series circuit. It will be obvious that so long as the motors 10 and 11 are operating at the same speed, so that the voltages across the two motors are the same, the midpoint of the autotransformer 47 will be at the same electrical potential as the midpoint 48 in the motor circuit and there will be no voltage impressed upon the operating winding 45. If, however, the speed of one of the motors increases due to some change in the external load, the voltage-drops across the motors 10 and 11 and their respective field circuits will change, and the electrical midpoint of the series circuit will be shifted so as to impress on the operating winding 45 a voltage which is proportional to the differential speed of the motors. The second relay operating winding 46 is connected for energization from any suitable source of energy, as for example the voltage across the motor 11, in circuit with an interlock contact 50 carried by the switch 26, and with a pair of normally open contacts 49 so that the winding 46 is prevented, in a manner to be more fully described later, from being energized except when the motors 10 and 11 are operating above a predetermined high speed.

Connected to the rotor 44 by means of an operating shaft 51, indicated by the broken line, is a crosshead 52, comprising the arms 53, 54 and 55, provided with a spring 56 for holding the crosshead against a stop 57 when the relay is de-energized. Pivoted at 58 adjacent the crosshead is a contact carrying member 59 for controlling the contacts 49 and a second pair of normally open contacts 60. Carried by the member 59 is a pin 61 which cooperates with the crosshead arm 53 to hold the contacts 49 and 60 in open circuit position against the force exerted by a spring 62 connected to the member 59 and normally tending to move the member 59 about its pivot to close the contacts 49 and 60. The circuit controlling contacts 49 and 60 are suitably insulated from each other as indicated at 65, the contacts 49 being arranged in the energizing circuit of the relay operating winding 46 as heretofore indicated, and the contacts 60 being connected in circuit with suitable visible and audible signalling means 66 and 67 and a source of signal energy 68.

When the crosshead 52 rotates in a clockwise direction, the arm 53 moves away from the pin 61 and the spring 62 moves the contact carrying member 59 about its pivot to close the contacts 49 and 60, a pin 62a serving as a stop for the member 59. The arm 55 then engages a pivoted member 69 normally biased by means of a spring 70 into engagement with a stop 71 and arranged to control the normally closed contacts 72 which are connected in circuit with the operating winding of the line switch 39. At the same instant that the contacts 72 are caused to open by further movement of the arm 55, the third crosshead arm 54 engages and is secured by a latch member 73 which is carried by a pivoted armature 74 normally biased to latching position by means of a spring 75. Arranged adjacent the latching armature 74, is a releasing electromagnet 76 having its winding connected in circuit with a push button 77 and a controller finger indicated somewhat diagrammatically at 78. The controller finger 78 is arranged on the controller 40 to complete an energizing circuit for the releasing coil 76 only when the controller 40 is in its "off" position in order that the relay 43 when once it is operated to its latched position, may be reset, i. e., released by operating the push button 77 only when the controller has been returned to its "off" position.

With the above description of the principal elements in mind, it is believed that a complete understanding of our invention may be had from a description of the operation of the system as a whole.

With the controller 40 in the "off" position and the relay 43 in its normally deenergized position, shown, the line switch 39 and the field control switches 14 and 15 are in open circuit position and the motor circuit is deenergized. It will now be assumed that the controller is moved to its first accelerating notch or position to energize the motors. When the controller is moved from its "off" position, a circuit is established for closing the line switch 39 and one or the other of the field control switches 14 and 15, depending upon the direction of rotation desired. Assuming that it is desired to accelerate the motors in a forward direction, the control circuit may be traced from the positive source of supply 80 through the relay contacts 72, the conductor 81, the operating winding of the line switch 39, the controller fingers (not shown), the conductor 82 and the operating winding of the switch 15 to the negative source of supply 83. It is believed that the circuit connections by means of which the switches 14 and 15 control the exciting fields 12 and 13 for forward or reverse rotation, are entirely obvious and that a detailed description is not necessary. Had it been desired to accelerate the motors in the reverse direction, the controller 40 upon actuation to the reverse position, would complete a circuit through the conductor 84 to energize the operating winding of the switch 14. As the controller 40 is advanced to accelerate the motors, the speed responsive relay 31 operates to control the interpole field currents in the manner set forth in the above-mentioned McNairy and Pritchard patent. Inasmuch as the details of the control of the interpole field currents form no part of the present invention, no further description is deemed necessary here other than to point out that as the motors attain a predetermined speed, for example two-thirds or three-fourths of the maximum permissible speed, the switch 26 is actuated to its upper position, thereby closing the interlock contacts 50.

So long as the motors 10 and 11 are accelerating at the same speed, there will be no voltage applied to the equipotential points 47 and 48 and the coils 45 of the relay 43 will not be energized. Assume now that with the motors operating at a low speed, a sudden decrease occurs in the load to which the motor 10 is connected, such for example as may be caused by the slipping of the vehicle wheels when the motors are utilized to drive an electric vehicle. As the relative speeds of the motors 10 and 11 change due to the change in load, a voltage which is proportional to the differential in the speed of the motors is applied to the operating winding 45 and a torque is exerted which tends to rotate the rotor 44 in a clockwise direction. When the torque exerted on the rotor 44 reaches a value corresponding to the first differential speed for which the relay has been set, the crosshead 52 is moved with a snap action in a clockwise direction to its first position with the arm 55 in engagement with the pivoted member 69, the spring 70 serving to prevent further movement of the crosshead. This releases the member 59 which is thereupon moved by the spring 62 to close the contacts 49 and 60. In order to provide for snap movement of the crosshead 52, the spring 56 is arranged to substantially prevent movement of the crosshead 52 until the torque exerted thereon reaches the desired value. At this value of torque the crosshead 52 begins to rotate and the line of action of the spring moves toward the shaft 51 whereby the biasing effect of the spring 56 decreases as the crosshead moves and a toggle action is obtained.

Since the motors are now operating at a low speed, the switch 26 is in its lower position, the interlock contacts 50 are open and, therefore, closing the contacts 49 has no effect on the operation of the relay. The contacts 60, however, complete the energizing circuit for the visible and audible signaling means 66 and 67 to warn the operator that an abnormal condition exists in the motor circuit. If the operator makes no attempt to rectify this condition, as by notching back on the controller, or otherwise, and the differential speed of the motors continues to increase, the torque on the crosshead 52 will increase until it becomes sufficient to overcome the bias of the spring 70, whereupon the arm 55 will move the member 69 about its pivot to open the contacts 72 and de nergize the operating winding of the line switch 39, thereby deenergizing the motor circuits. As has already been pointed out, at the same instant that the contacts 72 are opened the crosshead finger 54 engages the latch 73 and the relay is latched in its operated position with the contacts 72 in open circuit position.

In order to reset the relay and again to energize the motors, the controller 40 must be returned to its "off" position to close the circuit through the controller finger 78, and the reset button 77 must be actuated to complete the circuit to the operating winding of the resetting magnet 76. When the resetting magnet 76 is energized, the pivoted armature 74 will be moved to release the crosshead arm 54 and the operating elements of the relay 43 will be returned to their normal position by the biasing springs 56 and 70. The relay is now in its reset position and is ready to operate again as the motors are accelerated, to protect the motors against abnormal conditions due to a relative difference in the motor speeds.

It will now be assumed that the motors are operating at a sufficiently high speed so that the interpole field control relay 31 has operated to close the interlock contacts 50 in the circuit of the relay operating winding 46 and that a change occurs in speed of one of the motors. With the motors operating at this high speed, the permissible value of differential speed is, of course, greatly less than when the motors are operating at low speeds because of the small increase in speed which is permissible before excess speeds are obtained, and the relay 43 is accordingly arranged to deenergize the motor circuit on the occurrence of a lower differential speed. As the torque exerted on the rotor of the relay increases, the crosshead is again rotated to permit the contacts 49 and 60 to close. When the contacts 49 close, a circuit is completed which may be traced from the midpoint 48 in the motor series circuit through the right-hand half of the operating winding 45, the operating winding 46, the contacts 49, the conductor 85, the interlock contacts 50 and the conductor 86 to a terminal of the motor 11. It will be seen then that the operating winding 46 is energized in accordance with the voltage across the motor 11. Upon the energization of the operating winding 46, the rotor 44 and the crosshead 52 of the relay are immediately rotated to open the contacts 72 and deenergize the motor circuit. The relay is, of course, again latched in its operated position and may be reset only after the controller has been returned to its "off" position.

It will be seen that we have provided a slip relay for protecting the motors, which is arranged to energize a signal to warn the operator of the occurrence of a nominal differential in the speed of the motors, and which serves to disconnect the motor circuit from its source of energy upon the occurrence of a dangerous differential speed, the point of cut-off depending upon the speed at which the motors are operating whereby the motors are deenergized at a predetermined differential speed when operating at speeds within a predetermined range and are deenergized at another differential speed when operating at a speed outside of the predetermined range.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States is:

1. A protective system for electric motors connected for energization in series circuit relation comprising means differentially responsive to the speeds of said motors for deenergizing said motors upon the occurrence of a predetermined differential speed, and means responsive to the speed of said motors for controlling said differential speed responsive means to deenergize said motors at another differential speed when said motors are operating at a predetermined high speed.

2. A protective system for electric motors connected for energization in series circuit relation comprising means differentially responsive to the speeds of said motors for deenergizing said motors upon the occurrence of a predetermined differential speed when said motors are operating at speeds within a predetermned range, and means responsive to the speed of said motors for controlling said differential speed responsive means to deenergize said motors at another differential speed when said motors are operating at a speed outside said predetermined range.

3. A protective system for electric motors connected for energization in series circuit relation comprising means differentially responsive to the speeds of said motors for deenergizing said motors, and means responsive to the speed of said motors for controlling said differential speed responsive means to deenergize said motors at a lower differential speed when said motors are operating at a predetermined high speed.

4. A protective system for electric motors connected for energization in series circuit relation comprising means for deriving a voltage proportional to the differential speed of said motors, means responsive to said voltage for deenergizing said motors at a predetermined differential speed, and means responsive to the speed of said motors for controlling said voltage responsive means to cause deenergization of said motors at a lower differential speed when said motors are operating at a predetermined speed.

5. A protective system for electric motors connected for energization in series circuit relation comprising means for deriving a voltage proportional to the differential speed of said motors, a relay having an operating winding connected for energization in accordance with said voltage, means actuated by said relay for deenergizing said motors upon the occurrence of a predetermined differential speed, and means responsive to a predetermined speed of said motors for increasing the energization of said relay to actuate said deenergizing means upon the occurrence of a lower differential speed.

6. A protective system for electric motors connected for energization in series circuit relation comprising an autotransformer connected across said motors, a relay having an operating winding connected between a midpoint in said series motor circuit and a midtap on said autotransformer whereby said relay winding is energized in accordance with a voltage proportional to the differential speed of said motors, means actuated by said relay for deenergizing said motors upon the occurrence of a predetermined differential speed, and means responsive to a predetermined speed of said motors for additionally energizing said relay to actuate said deenergizing means upon the occurrence of a lower differential speed.

7. A protective system for electric motors connected for energization in series circuit relation comprising means for producing a signal, means for deenergizing said motors, means differentially responsive to the speeds of said motors for actuating said signal producing means upon the occurrence of a predetermined differential speed and for actuating said deenergizing means upon the occurrence of a second differential speed, and means responsive to the speed of said motors for controlling said differentially responsive means to cause deenergization of said motors at another differential speed when said motors are operating at a predetermined high speed.

8. A protective system for electric motors connected for energization in series circuit relation comprising means responsive to a predetermined differential in the speeds of said motors for producing a signal, means responsive to a second predetermined differential in the speeds of said motors for deenergizing said motors, and means responsive to the speed of said motors and to an operation of said signal producing means for actuating said deenergizing means to deenergize said motors upon the coincident occurrence of said first-mentioned differential speed and a predetermined high motor speed.

9. A protective system for electric motors connected for energization in series circuit relation comprising means for deriving a voltage proportional to the differential speed of said motors, means responsive to said voltage for producing a signal upon the occurrence of a predetermined differential motor speed, means also responsive to said voltage for deenergizing said motors upon the occurrence of a higher differential motor speed, and means jointly responsive to said voltage and to the operating speed of said motors for actuating said deenergizing means to deenergize said motors upon the coincident occurrence of said first differential speed and a predetermined high motor speed.

10. A protective system for electric motors connected for energization in series circuit relation comprising means for deriving a voltage proportional to the differential speed of said motors, a relay connected for energization in accordance with said voltage, means responsive to an operation of said relay corresponding to a predetermined differential speed for producing a signal, means responsive to a further operation of said relay corresponding to a second differential speed for deenergizing said motors, and means responsive to a predetermined speed of said motors and to said first operation of said relay for producing an immediate further rotation of said relay to deenergize said motors upon the coincident occurrence of said first differential speed and said predetermined motor speed.

11. A protective system for electric motors connected for energization in series circuit relation comprising means for deriving a voltage proportional to the differential speed of said motors, a relay having an operating element consisting of a single-phase shaded pole induction motor, an operating winding for said relay connected for energization in accordance with said voltage, means actuated by a rotation of said relay corresponding to a predetermined differential speed for producing a signal, means responsive to a further rotation of said relay corresponding to a second differential speed for deenergizing said motors, a second winding for said relay, and means responsive to a predetermined speed of said motors and to said first rotation of said relay for energizing said second winding, whereby said further rotation of said relay is caused to take place to deenergize said motors upon the coincident occurrence of said first differential speed and said predetermined motor speed.

12. A control system comprising a plurality of single-phase commutator motors arranged for energization in series circuit relation and each having an exciting field winding and an interpole field winding, means for accelerating said motors, means responsive to the speed of said motors for controlling said interpole field windings, means for deenergizing said motors upon the occurrence of a predetermined differential in motor speeds, and means actuated by said interpole field controlling means for controlling said deenergizing means to deenergize said motors at a lower differential speed when said motors are operating at a predetermined high speed.

13. In combination, a plurality of motors connected for energization in series circuit relation, a controller for governing the operation of said motors, means connected across said motors for deriving therefrom a voltage proportional to the differential speed thereof, a relay having an operating element consisting of a single-phase shaded pole induction motor, means for energizing said relay in accordance with said differential voltage, means actuated by a rotation of said relay corresponding to a predetermined differential voltage for producing a signal, means actuated by a further rotation of said relay for deenergizing said motors, means for latching said relay in said second position, means for releasing said latch to reset said relay, and means for preventing energization of said releasing means until said controller is moved to the off position.

JACOB W. McNAIRY.
HAROLD S. OGDEN.